(12) United States Patent
Childs et al.

(10) Patent No.: US 9,344,464 B2
(45) Date of Patent: May 17, 2016

(54) PROVISIONING OF PLAYER FOR CONTENT

(71) Applicant: Lenovo (Singapore) Pte. Ltd., Singapore (SG)

(72) Inventors: Philip Lee Childs, Durham, NC (US); Michael Terrell Vanover, Raleigh, NC (US); Goran Hans Wibran, Cary, NC (US); Richard Wayne Cheston, Pittsboro, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 335 days.

(21) Appl. No.: 13/689,884

(22) Filed: Nov. 30, 2012

(65) Prior Publication Data
US 2014/0156843 A1 Jun. 5, 2014

(51) Int. Cl.
*H04L 29/06* (2006.01)
*H04L 29/08* (2006.01)

(52) U.S. Cl.
CPC ............ *H04L 65/40* (2013.01); *H04L 65/4084* (2013.01); *H04L 67/16* (2013.01); *H04L 67/34* (2013.01)

(58) Field of Classification Search
CPC ..... H04L 65/40; H04L 65/4084; H04L 67/34; H04L 67/16; H04L 29/06
See application file for complete search history.

(56) References Cited

U.S. PATENT DOCUMENTS

| 7,171,390 B1* | 1/2007 | Song et al. ................. 705/52 |
| 2002/0052229 A1* | 5/2002 | Halliburton et al. ............. 463/9 |
| 2003/0131226 A1* | 7/2003 | Spencer et al. ............... 713/100 |
| 2006/0223600 A1* | 10/2006 | Wisdom ................. A63F 13/10 463/1 |
| 2008/0288976 A1* | 11/2008 | Carson et al. .................. 725/34 |
| 2009/0253414 A1* | 10/2009 | Gosselin et al. ........... 455/414.1 |
| 2010/0058478 A1* | 3/2010 | Shetty ..................... G06F 21/10 726/26 |
| 2010/0114857 A1* | 5/2010 | Edwards et al. .............. 707/709 |
| 2012/0174093 A1* | 7/2012 | Davila et al. ................. 717/178 |
| 2012/0197977 A1* | 8/2012 | Nagasaka et al. ............ 709/203 |

* cited by examiner

*Primary Examiner* — Arvin Eskandarnia
(74) *Attorney, Agent, or Firm* — Ference & Associates LLC

(57) ABSTRACT

An aspect provides a method, including: responsive to receiving a content request of a user device, determining if the user device has access to one or more applications associated with the content requested; responsive to determining that the user device does not have one or more applications associated with the content requested, determining an associated application; and responsive to determining an associated application, provisioning access to the associated application for the user device. Other aspects are described and claimed.

16 Claims, 5 Drawing Sheets

PROVISIONING OF PLAYER FOR CONTENT

BACKGROUND

Information handling devices ("devices"), for example cell phones, smart phones, tablet devices, laptop and desktop computers, servers, etc., may be used to access, view, edit or otherwise handle data stored elsewhere, for example as accessed via a cloud-based computing solution. Cloud-based computing solutions are beginning to offer richer user experiences over and above simple data storage offerings.

As an example, LENOVO CLOUD is a cloud-based computing solution that delivers an enhanced end user experience to individuals and businesses regardless of location, e.g., at home, at work or on the move. Cloud-based solutions offer services and applications over and above content access and storage, for example encompassing a range of products and services that deliver a consistent, secure digital experience, and product enhancements for both single users and enterprises. Cloud-based solutions give users secure access to their data and applications wherever they are, without clogging up the data center or drawing on IT staff resources. This allows organizations to create a balanced approach to cloud computing that may utilize built-in, cloud ready capabilities available in LENOVO hardware, as well as allowing users secure access from any other information handling device, including but not limited to personal computers (PCs), tablets, smartphones, and the like.

BRIEF SUMMARY

In summary, one aspect provides a method, comprising: responsive to receiving a content request of a user device, determining if the user device has access to one or more applications associated with the content requested; responsive to determining that the user device does not have one or more applications associated with the content requested, determining an associated application; and responsive to determining an associated application, provisioning access to the associated application for the user device.

Another aspect provides an information handling device, comprising: one or more processors; and a memory operatively coupled to the one or more processors that stores instructions executable by the one or more processors to perform acts comprising: responsive to receiving a content request of a user device, determining if the user device has access to one or more applications associated with the content requested; responsive to determining that the user device does not have one or more applications associated with the content requested, determining an associated application; and responsive to determining an associated application, provisioning access to the associated application for the user device.

A further aspect provides a program product, comprising: a storage medium having computer program code embodied therewith, the computer program code comprising: computer program code configured to, responsive to receiving a content request of a user device, determine if the user device has access to one or more applications associated with the content requested; computer program code configured to, responsive to determining that the user device does not have one or more applications associated with the content requested, determine an associated application; and computer program code configured to, responsive to determining an associated application, provision access to the associated application for the user device.

Another aspect provides a method, comprising: receiving content at a user device from a remote device; determining, at the user device, the user device does not have one or more applications associated with the received content; sending a request to the remote device for an associated application; receiving an associated application responsive to the request to the remote device for an associated application.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
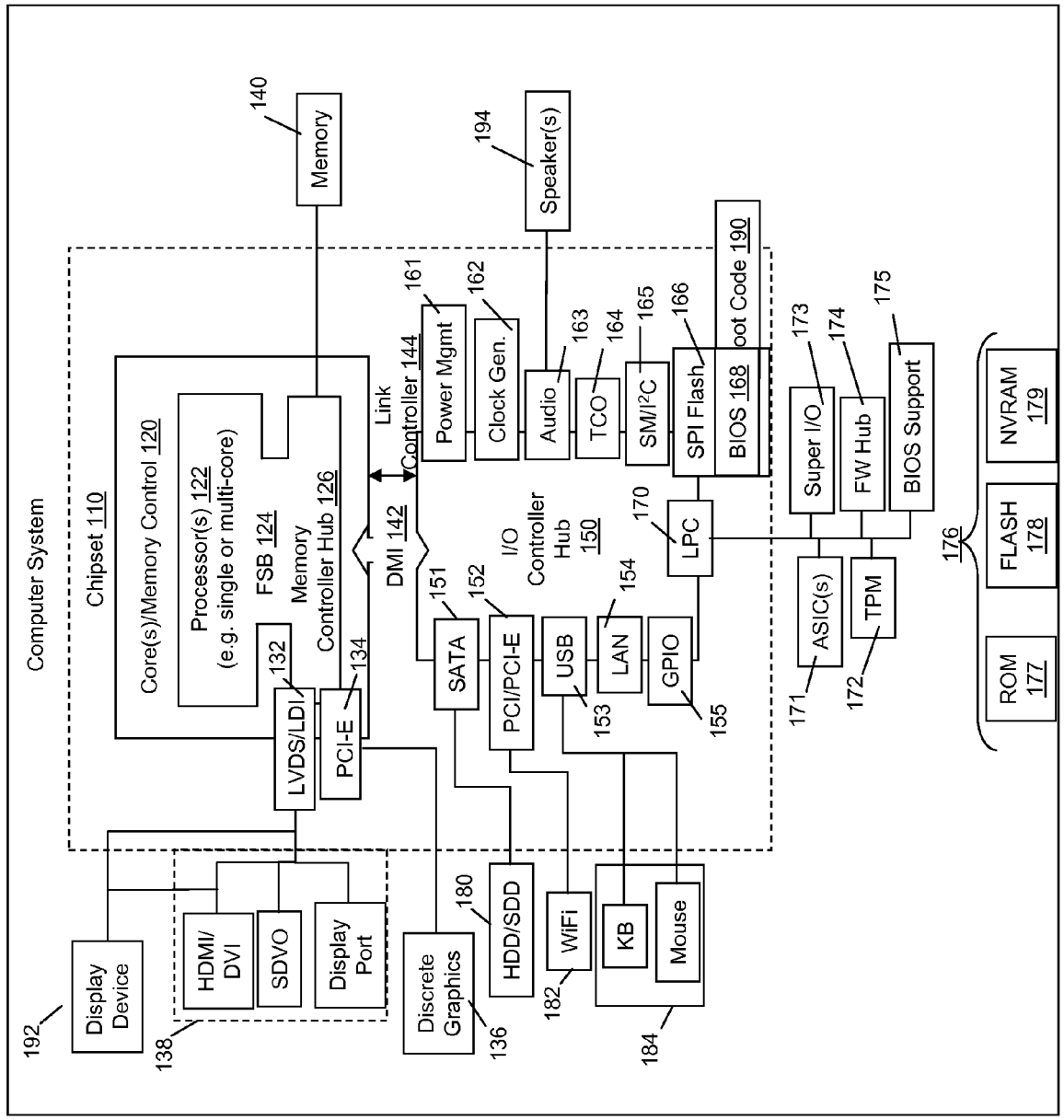
FIG. 1 illustrates an example information handling device and components thereof.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When a user attempts to access content, e.g., a MICROSOFT WORD document or a video file, the user's device needs an application associated with the content. For example, although the user's device may have a MICROSOFT WORD document or a video file saved to memory or accessible via cloud storage application, the user's device nonetheless needs an associated application, e.g., MICROSOFT WORD or related word processing application, on in the case of a video file, an appropriate media player, to access, view, edit, interact with, etc., the particular content.

Often times, a user's device will not have (or have access to) the appropriate associated application. This problem may be particularly acute when the user obtains a new device or when the user is accessing content via a cloud-based application (e.g., due to the extensive amount and variety of content types available). Conventionally, the user's device determines that the content cannot be accessed due to a lack of an appropriate application and offers the user a manual way to remedy the situation (e.g., providing a link to download an application associated with the content type). This can be frustrating as it interrupts the user's expected access to the content, and may lead a user to abandon attempts to access such content.

Accordingly, an embodiment provides mechanisms to provision an appropriate application to seamlessly access content types for which the user's device may not have an associated application. The term provision (or provisioning, etc.) is defined herein to mean providing access to an application for use by a device, either on a temporary or permanent basis. Examples of provisioning an application to a user device therefore include providing an application as a download to the user device and/or granting access to the application for use by the user device, such as granting access to the application as hosted by a remote device. By such provisioning mechanisms, embodiments facilitate convenient and uninterrupted content access, for example of data streamed to a user device via a cloud service.

The illustrated example embodiments will be best understood by reference to the figures. The following description is intended only by way of example, and simply illustrates certain example embodiments.

Figure 2:
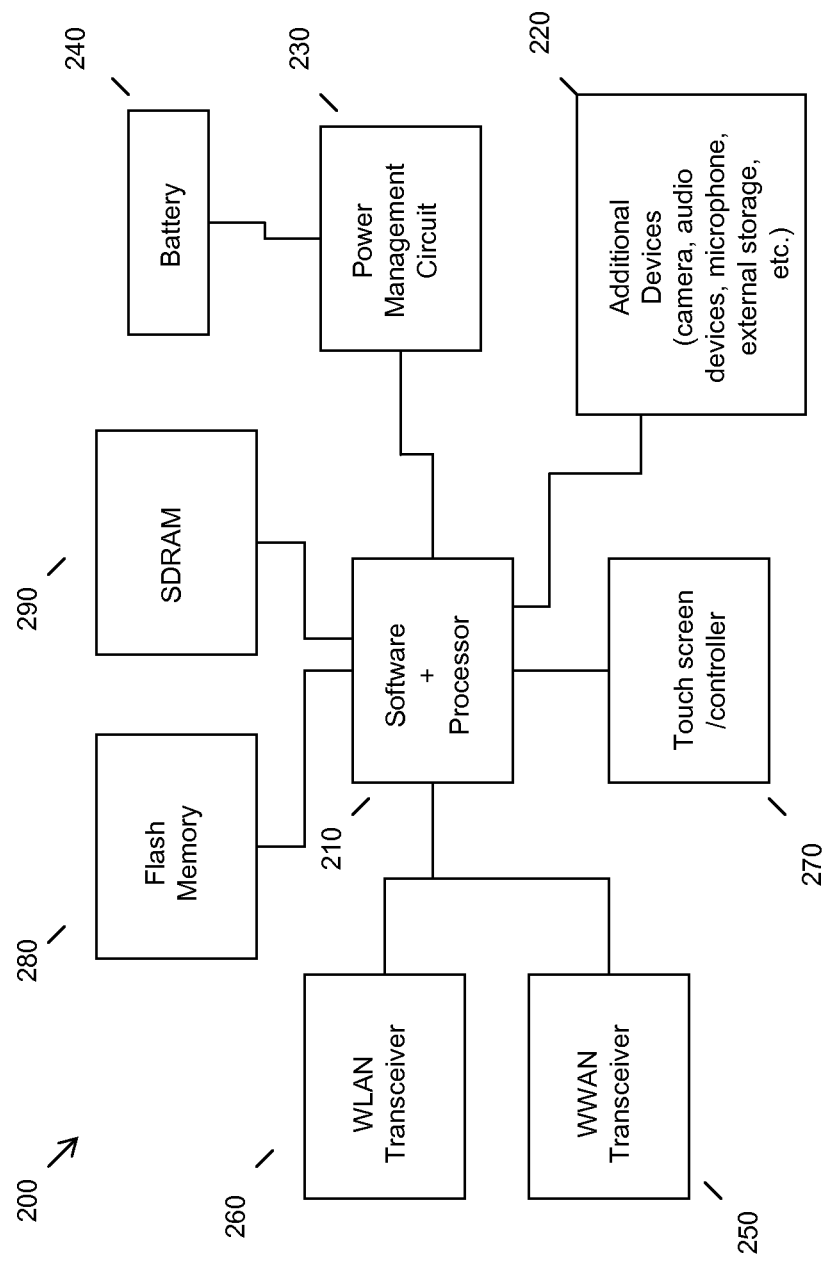
FIG. 2 illustrates another example information handling device and components thereof.

Referring to FIG. 1 and FIG. 2, while various other circuits, circuitry or components may be utilized, with regard to smart phone and/or tablet circuitry 200, an example illustrated in FIG. 2 includes an ARM based system (system on a chip) design, with software and processor(s) combined in a single chip 210. Internal busses and the like depend on different vendors, but essentially all the peripheral devices (220) may attach to a single chip 210. In contrast to the circuitry illustrated in FIG. 1, the tablet circuitry 200 combines the processor, memory control, and I/O controller hub all into a single chip 210. Also, ARM based systems 200 do not typically use SATA or PCI or LPC. Common interfaces for example include SDIO and I2C. There are power management chip(s) 230, which manage power as supplied for example via a rechargeable battery 240, which may be recharged by a connection to a power source (not shown), and in at least one design, a single chip, such as 210, is used to supply BIOS like functionality and DRAM memory.

ARM based systems 200 typically include one or more of a WWAN transceiver 250 and a WLAN transceiver 260 for connecting to various networks, such as telecommunications networks and wireless base stations. Commonly, an ARM based system 200 will include a touch screen 270 for data input and display. ARM based systems 200 also typically include various memory devices, for example flash memory 280 and SDRAM 290.

FIG. 1 depicts a block diagram of one example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Information handling devices, as for example outlined in FIG. 1 and FIG. 2, may include user devices or cloud computing devices. For example, FIG. 1 may be a device that provides a cloud computing environment with cloud-based services accessible to a user device, for example as illustrated in FIG. 2. Thus, a user may use his or her device 200 to connect to a cloud-based solution device, for example by logging into a cloud account to access data, including but not limited to accessing various content (e.g., document files, music files, video files, etc.) and accessing application services (e.g., hosted applications for content handling).

Figure 3:
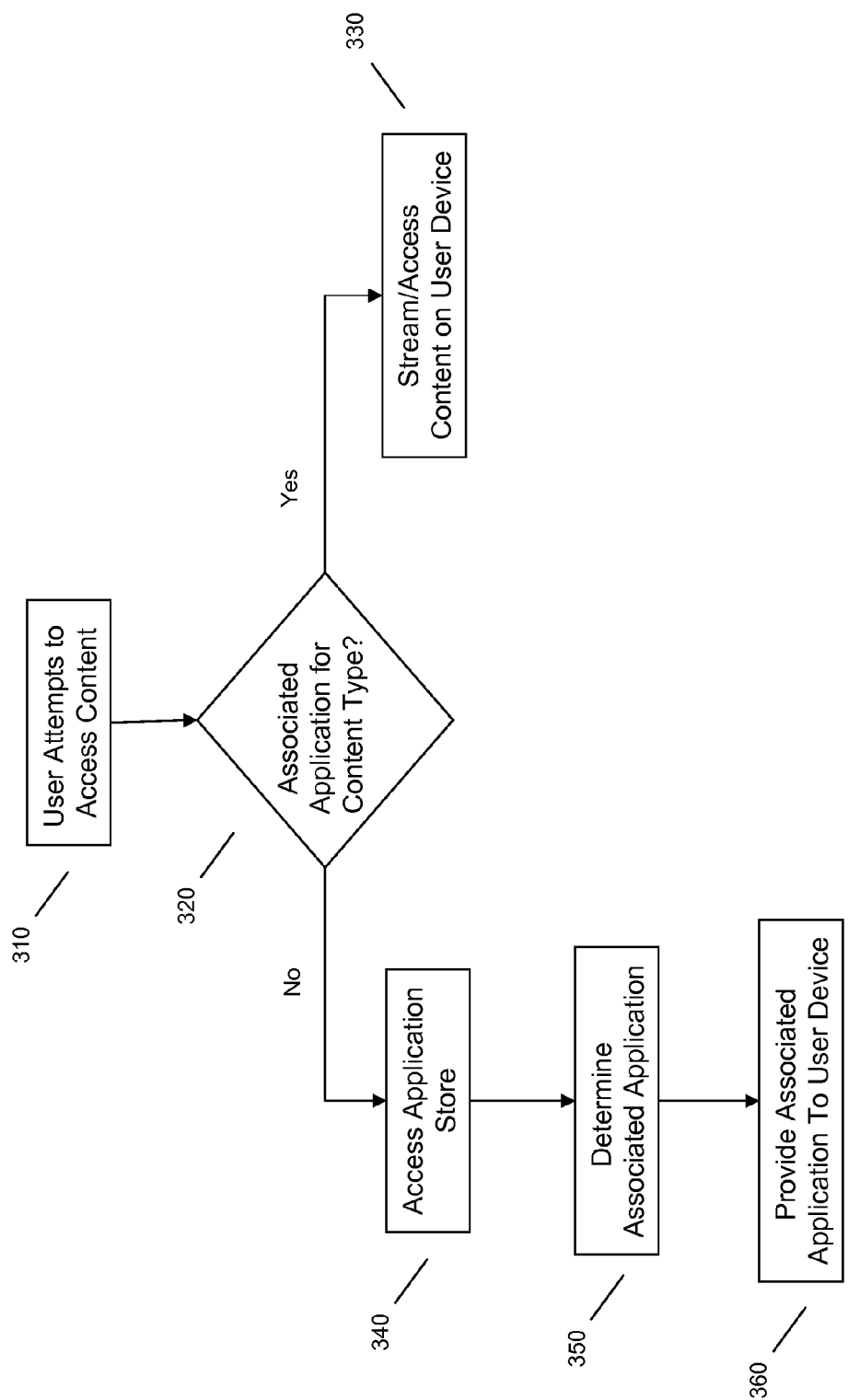
FIG. 3 illustrates an example method of provisioning access to an associated application.

Referring to FIG. 3, when a user attempts to access content at 310, for example using a device 200 to access content provided by a cloud computing solution (i.e., content resident on a remote device accessed over a network connection), a determination is made as to whether the user's device 200 has the associated application in question at 320. This determination may be accomplished in a variety of ways, e.g., via device 200 identification, user identification (e.g., as via associating a cloud account with the requesting device) or the like compared to a content type requested. Responsive to a determination that the user's device 200 does have such an application for handling a content type requested the content may be streamed or otherwise provided (e.g., played, displayed, etc.) on the user's device 200 at 330.

If it is determined at 320 that the user's device 200 does not have the appropriate associated application for handling a requested content type, an embodiment may provide access to the associated application to the user's device 200. The associated application may be provided on a temporary or permanent basis, as further described herein.

In one example, in response to a determination that the user's device 200 does not have the associated application at 320, an embodiment may access a repository of applications, e.g., and application store, at 340 to obtain the application. An embodiment determines (e.g., based on content file type or like characteristic(s) of the content being accessed) an appropriate associated application at 350. In response to determining an associated application for the content type in question, an embodiment provides the associated application to the user's device 200 (e.g., as a download over a network connection) at 360, thus enabling the user to access the content without taking further action(s) (e.g., searching out and installing an appropriate associated application).

Thus, if a user's remote device 200 does not have the necessary application, e.g., a media "player" application, to access cloud content, the content cannot be accessed (e.g., streamed) without further user intervention. As above, this may necessitate a user having to determine the appropriate application, search for the appropriate application (e.g., media player) via other programs (e.g., browser-based search, application marketplace/store search, etc.) after observing a failure in content access. Only if and when the appropriate application has been located by the user may the streaming process be restarted for content access. If a content controller is physically remote, the delay may be compounded by necessitating additional communication to have the process restarted. An embodiment therefore preemptively detects that the appropriate application is not currently installed on the user's device 200, provisions an instance of the application to the user's device 200 (e.g., as a download or access permission to a hosted application, etc.), followed, e.g., by staring the streaming process of content to the user's device 200.

Figure 4:
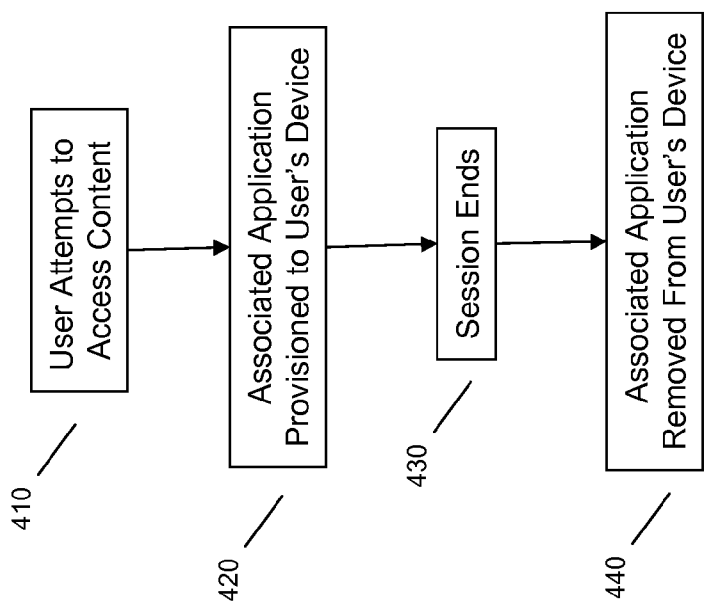
FIG. 4 illustrates an example method of removing access to an associated application.

Referring to FIG. 4, an embodiment may provide a temporary instance of the associated application to the user's device 200. For example, a user may attempt to access an atypical content type at 410 for which a special application is required, e.g., a special media file type requiring a special media player that the user does not have resident on his or her device 200. An embodiment may provision an instance of the media player at 420, e.g., as outlined in FIG. 3, for streaming and playing the media file. After the session has completed at 430, an embodiment may remove the media player from the device 200 at 440. The removal may be accomplished for example by providing an instruction to the user's device 200 regarding removal, may be built into a temporary player instance (e.g., as a time-based deletion or removal instruction incorporated therein or therewith), or the temporary instance may be remotely hosted and employ as time-based or otherwise regulated access routine.

Figure 5:
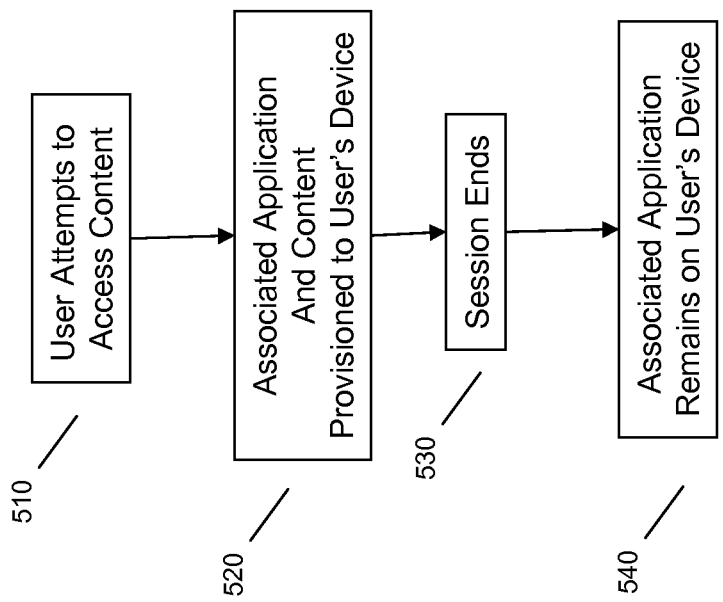
FIG. 5 illustrates an example method of provisioning permanent access to an associated application.

Additionally, an embodiment may provide the user device 200 with a permanent (or semi-permanent) instance of the associated application. For example, referring to FIG. 5, when a user operates his or her device 200 to accesses content at 510, e.g., via a cloud computing solution session, an embodiment may determine the user's device 200 needs an associated application. Along with providing access to the content, an embodiment may determine the appropriate application (e.g., media player) and include it with the provisioning of the content 520. This would permit a "download and play" capability, which could be executed by user immediately (e.g., on completion of the download) or at a later time. The user device 200 would thus be provided with a download of the associated application that could remain after the session ends 530 for future use 540.

Thus, an embodiment provides a permanent instance of the appropriate application for the media (e.g., being streamed from a cloud application) to be provided to the user device 200, rather than sending a temporary application instance. An embodiment additionally may allow the user to buy the associated application, e.g., from a cloud application store. The option to purchase may be presented for user approval at a variety of times. For example, a user may have to authorize the purchase of the application download prior to download of the application and/or accessing associated content, at the end of a particular session, at the end of a trial period, as part of a cloud subscription agreement, or the like.

An embodiment may also permit a user to rent a particular associated application or pay for use of a particular associated application on a per-use basis. For example, an embodiment may provide the user with the option to rent a particular application for a limited period of time, e.g., single use or multiple uses. In such a context, the user would be permitted to use the application on the device per the terms of such a rental agreement. In an example, a rental could amount to a per-use charge associated with a temporary instance of a player. In another example, this rental could amount to a fee-per-time charge associated with a downloaded application (semi-permanent or permanent application provisioning), in which usage is monitored and reported to a cloud device. Moreover, a user may be given an option to convert a rented application to a purchased application (e.g., unlimited usage of an initially rented application). This may be appropriate if an initially rented application is often accessed by a user.

In any event, an embodiment permits a user to seamlessly enjoy content access without reverting to additional actions (e.g., manual look-ups and downloads/installs of associated applications), as well as providing the user with a variety of ways in which applications that carry a charge may be accessed either temporarily, intermittently, or permanently. Additionally, some applications may carry no charge or may be provided at no separate charge, e.g., if the user has a cloud subscription service.

In an embodiment, the logic for determining an appropriate associated application to handle a content requested is implemented as a cloud service on a device remote from the user's device 200. As described herein, the appropriate associated application may be selected on the basis of one or more of content type, user device type, user device operating system type, cost of the associated application, user login or account details (including but not limited to cloud computing subscription details) and the like.

While the various example embodiments have been described in connection with provisioning applications associated with content types, such as media players for playing streaming media files in the context of cloud computing services, these were provided as non-limiting examples. Accordingly, embodiments may be used to provide other application types and services in other contexts. Similarly, although devices such as tablets, smart phones and cloud based devices have been used in the description as specific examples, embodiments may be utilized in connection with other types of devices, for example, e-readers, desktop computers, kiosks, and the like.

It will also be understood that the various embodiments may be implemented in one or more information handling devices configured appropriately to execute program instructions consistent with the functionality of the embodiments as described herein. In this regard, FIG. 1 and FIG. 2 illustrate non-limiting examples of such devices and components thereof.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
responsive to receiving a content request of a user device, determining, at a remote device, if the user device has access to one or more applications associated with the content requested;
responsive to determining that the user device does not have one or more applications associated with the content requested, preemptively determining an associated application and provisioning access to the associated application for the user device as a remotely hosted application without further user interaction.

2. The method of claim 1, further comprising removing the associated application from the user device after a predetermined time.

3. The method of claim 2, wherein the predetermined time is calculated using an instruction included with the associated application.

4. The method of claim 2, further comprising providing an instruction to the user device, the instruction comprising an application access removal instruction.

5. The method of claim 1, wherein content request is received at a remote device connected to the user device via a network connection.

6. The method of claim 1, wherein the provisioning access includes one or more options comprising: an application rental option, an application purchase option, and verifying if the user has a subscription service.

7. The method of claim 1, further comprising notifying the user of the associated application.

8. The method of claim 7, wherein the notifying occurs subsequent to content access.

9. An information handling device, comprising:
one or more processors; and
a memory operatively coupled to the one or more processors that stores instructions executable by the one or more processors to:

responsive to receiving a content request of a user device, determining, at a remote device, if the user device has access to one or more applications associated with the content requested;

responsive to determining that the user device does not have one or more applications associated with the content requested, preemptively determining an associated application and provision access to the associated application for the user device as a remotely hosted application.

10. The information handling device of claim 9, wherein the acts further comprise removing the associated application from the user device after a predetermined time.

11. The information handling device of claim 10, wherein the predetermined time is calculated using an instruction included with the associated application.

12. The information handling device of claim 9, wherein content request is received at by the information handling device via a network connection linking the information handling device and the user device.

13. The information handling device of claim 9, wherein to provision access includes one or more options comprising: an application rental option, an application purchase option, and verifying if the user has a subscription service.

14. The information handling device of claim 9, wherein to notify occurs subsequent to content access.

15. The information handling device of claim 9, wherein the instructions are further executable by the processor to notify the user of the associated application.

16. A program product, comprising:

a storage medium having computer program code embodied therewith, the computer program code being executable by a processor and comprising:

computer program code that, responsive to receiving a content request of a user device, determines, at a remote device, if the user device has access to one or more applications associated with the content requested;

computer program code that, responsive to determining that the user device does not have one or more applications associated with the content requested, preemptively determines an associated application and provisions access to the associated application for the user device as a remotely hosted application.

\* \* \* \* \*